United States Patent
Larson et al.

(10) Patent No.: US 11,681,456 B2
(45) Date of Patent: Jun. 20, 2023

(54) COMPACTION POLICIES FOR APPEND-ONLY STORES

(71) Applicant: HUAWEI CLOUD COMPUTING TECHNOLOGIES CO., LTD., Gui Zhou Province (CN)

(72) Inventors: Per-Ake Larson, Etobicoke (CA); Alexandre Depoutovitch, Toronto (CA)

(73) Assignee: HUAWEI CLOUD COMPUTING TECHNOLOGIES CO., LTD., Gui Zhou Province (CN)

( * ) Notice: Subject to any disclaimer, the term of this patent is extended or adjusted under 35 U.S.C. 154(b) by 0 days.

(21) Appl. No.: 17/324,663

(22) Filed: May 19, 2021

(65) Prior Publication Data
US 2022/0374160 A1    Nov. 24, 2022

(51) Int. Cl.
*G06F 3/06*    (2006.01)

(52) U.S. Cl.
CPC .......... *G06F 3/0652* (2013.01); *G06F 3/0605* (2013.01); *G06F 3/0608* (2013.01); *G06F 3/0631* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 2006/0224853 | A1* | 10/2006 | Shimazaki | G06F 3/0605 711/171 |
| 2016/0378818 | A1 | 12/2016 | Marcotte | |
| 2018/0225316 | A1 | 8/2018 | Boles et al. | |

FOREIGN PATENT DOCUMENTS

| | | | | |
|---|---|---|---|---|
| CN | 109802684 A | * | 5/2019 | ............ G06F 12/02 |
| CN | 110232054 A | | 9/2019 | |
| CN | 111684437 A | | 9/2020 | |
| KR | 102113212 B1 | * | 5/2020 | |
| WO | WO-2011048640 A1 | * | 4/2011 | ........... G06F 3/0605 |

OTHER PUBLICATIONS

Rosenblum et al., The design and the Implementation of a Log Structured File System, ACM Transactions, Computer Systems, vol. 10, No. 1, Feb. 1992.
Stoica et al., Improving Flash Write Performance by Using Update Frequency, PVLDB 6(9): 733-744 (2013).
Dayan et al., Garbage Collection Techniques for Flash-Resident Page-Mapping FTLs, arXiv:1504.01666v1, Apr. 7, 2015.
Dayan et al., Modelling and Managing SSD Write-amplification, arXiv:1504.00229v1, Apr. 1, 2015.
Desnoyers, P., Analytic Models of SSD Write Performance, ACM Trans. Storage (Jan. 2012), 25 pages.
(Continued)

*Primary Examiner* — Christopher D Birkhimer

(57) ABSTRACT

A method of reducing write amplification in an append-only memory store of data records, by which the store is subdivided into streams, each of which for storing records having an update frequency within a variable range of update frequencies. By defining an update frequency that does not rely on time, statistical methods can be used to select the streams in which data records can be written. The range of update frequencies of each stream can be fixed or variable and based on the stored records. The memory allocated to each stream can be determined based on numerically solving an optimization problem that determines the write amplification resulting from different memory allocations in the streams.

21 Claims, 8 Drawing Sheets

(56) References Cited

OTHER PUBLICATIONS

Yang, Jingpei et al., AutoStream: automatic stream management for multi-streamed SSDs, SYSTOR '17, May 22-24, 2017, 11 pages.
Gradient Descent, Wikipedia article, https://en.wikipedia.org/wiki/Gradient_descent (2021).

* cited by examiner

COMPACTION POLICIES FOR APPEND-ONLY STORES

RELATED APPLICATIONS

This is the first application filed for the present invention.

FIELD OF THE INVENTION

This invention pertains generally to the field of digital information storage and in particular, to methods of efficiently writing information in an append-only memory store of data records.

BACKGROUND

An append-only store is a data store to which new data records or new versions of data records are always appended, and prior versions are never overwritten. Append-only stores can be called logs and the two terms can be used interchangeably.

To prevent an append-only store from growing indefinitely, older versions of data records can be discarded, and the memory they use can be reclaimed. This process, referred to as either "compaction" or "garbage collection" (GC), can be invoked periodically, on demand, or with a triggering condition.

When designing an append-only store, a general objective is to minimize the amount of data written during a compaction process. Such minimization can reduce the central processing unit (CPU) overhead, the input/output (I/O) operations, and the wear on storage devices, solid state drives (SSDs) in particular.

The overhead is measured by write amplification (WA), which is the average number of times a version of a record is written until it is discarded during garbage collection. Ideally, WA=1.0 meaning that the version is written once when it is created and never copied until it is garbage collected.

There is a need for methods and systems that can obviate or mitigate one or more limitations of the prior art by minimizing, during the compaction of an append-only data store, the amount of data written and the write amplification (WA).

This background information is provided to reveal information believed by the applicant to be of possible relevance to the present invention. No admission is necessarily intended, nor should be construed, that any of the preceding information constitutes prior art against the present invention.

SUMMARY

The present invention consists of methods to minimize write amplification (WA) during the compaction process of an append-only memory store of data records, and a suitable append-only store. The problem of reducing write amplification is addressed by dividing an append-only store into a plurality of streams, and defining a range of update frequencies for each stream. By defining a frequency that is independent of time, statistical methods can be used to determine to which stream a new data record, or a new version of a data record, can be written. With such a classification, the records that are least often updated are not subject to compaction. Further, an optimization problem can be set and numerically solved, to allocate memory among the streams in a way that minimizes write amplification.

Embodiments include a method for updating a data record stored in an append-only store, comprising: dividing into streams the append-only store, each stream storing at least one data record having an estimated update distance, and each stream corresponding with a different range of estimated update distances; receiving a data record; estimating the update distance of the data record; selecting in the append-only store, a stream having a range of estimated update distances that includes the estimated update distance of the data record; and writing the received data record to the selected stream; wherein for a data record P, the estimated update distance D(P), of the data record P, is substantially a function of the number of updates to data records other than data record P, between successive updates to data record P. In embodiments, estimating the update distance of a data record can comprise computing the logarithmic update distance between at least one pair of successive updates of the data record received; and computing the exponentially weighted moving average (EWMA) of the logarithmic update distance, using the logarithmic update distances between the at least one pair of successive updates of the data record received. In embodiments, selecting a stream can comprise, for each stream: computing the logarithmic update distance between at least one pair of successive updates of a data record in the stream; computing the exponentially weighted moving average (EWMA) of the logarithmic update distance, using the at least one pair of successive updates of a data record in the stream; computing the exponentially weighted moving standard deviation of the logarithmic update distance, using the at least one pair of successive updates of the data record in the stream, and selecting a stream based on the exponentially weighted moving average (EWMA) of the logarithmic update distance, and the exponentially weighted moving standard deviation of the logarithmic update distance. In embodiments, a range of estimated update distances that is specific to a stream can have fixed bounds. In embodiments, the fixed bounds of a range of estimated update distances can be equally spaced on a logarithmic scale. In embodiments, a range of estimated update distances that is specific to a stream can have variable bounds. In embodiments, a method can further comprise writing the data record to the stream, if the estimated update distance of the data record is within a factor of the standard deviation from the estimated update distance in the stream; verifying a neighbouring stream, and assigning the data record to the neighbouring stream, if the estimated update distance of a data record is within a factor of the standard deviation from the estimated update distance in the neighbouring stream; creating a new stream, if the estimated update distance of a data record is outside a factor of the standard deviation from the estimated update distance in any stream; and merging a stream with another stream, if either stream contains less than a set minimum number of data records. In embodiments, conditions for creating a new stream can further include the number of streams remaining less than a set maximum number of streams; and the estimated average logarithmic update distance and standard deviation in a stream being calculated using at least a set minimum number of updates in the stream. In embodiments, a method can further include dividing each stream into at least one segment, each segment storing at least one data record, and performing a compaction process that is triggered under user-defined conditions; and that comprises copying live records from one segment of a stream to another stream, and discarding a segment storing at least one obsolete data record; where a live record is a data record that is not obsolete and that must not be discarded. In embodiments, a compaction process can further include: using an append-only store having a set memory limit; using a triggering condition based on whether the memory required to store the data records exceeds the append-only store's set memory limit; finding in the streams, the segment having the fewest live versions of data records; selecting for each live record, of the segment having the fewest live versions of data records, the stream having a range of average logarithmic update distances that includes the average logarithmic update distance of the live record, based on the live record's average logarithmic update distance as estimated using EWMA methods; and appending the live record to the selected stream. In embodiments, a compaction process can further comprise using streams that store data records having estimated update distances, in a range of estimated update distances that is fixed. In embodiments, a compaction process can further comprise using streams that store data records having estimated update distances, in a range of estimated update distances that is variable and based on the estimated update distances of the data records received by and stored in the streams. In embodiments, a compaction process can further comprise: creating a new stream to store a live record, if none of the existing streams has a range of estimated update distances that includes the estimated update distance of the live record; and merging two streams, if one of the existing streams stores less than a set minimum number of data records. In embodiments, a compaction process can further comprise: using streams, each stream having a set memory limit; determining the stream for which the compaction process is expected to reduce write amplification the most; using a triggering condition based on whether the stream's memory usage exceeds the stream's set memory limit; selecting for compaction the segment in the stream, having the fewest live versions of data records; selecting for each live record of the segment, the stream having a range of estimated update distances that includes the estimated update distance of the live record, based on the live record's estimated update distance; and appending the live record to the selected stream. In embodiments, a compaction process can further comprise using streams that store data records having estimated update distances, in a range of estimated update distances that is fixed. In embodiments, a compaction process can further comprise using streams that store data records having estimated update distances, in a range of estimated update distances that is variable and based on the estimated update distances of the data records received by and stored in the streams. In embodiments, a compaction process can further comprise: creating a new stream to store a live record, if none of the existing streams has a range of estimated update distances that includes the estimated update distance of the live record; and merging two streams, if one of the existing streams stores less than a set minimum number of data records. In embodiments, determining the stream for which compaction is expected to reduce write amplification the most, can comprise: optimally distributing memory usage among the streams by formulating the optimal distribution of memory usage among the streams as an optimization problem, and periodically computing the optimal distribution. In embodiments, an optimization problem can be formulated by: using for each stream: the number of data records assigned to the stream, the fraction of updates to the stream relative to the total number of updates to all streams, and the Lambert W function to express the probability that the earliest version of a data record has not been updated in the stream; summing the products between fractions of updates and probabilities; and minimizing the summation of products between fractions of updates and probabilities, considering the memory limits of each stream, and the memory limit of all the stream.

In embodiments, an append-only store can comprise: a plurality of streams, each stream designated to store at least one data record having an estimated update distance within a range of estimated update distances specific to the stream; an input operative to receive at least one of: a new data record and an updated version of a data record; a processor operative for: estimating the update distance of a data record; selecting in the append-only store of data records, a stream having a range of estimated update distances that includes the estimated update distance of a data record; and writing a data record to the selected stream; wherein the estimated update distance of a data record P is substantially a function of the number of updates to data records other than data record P, between successive updates to data record P. In embodiments, an append-only store can further comprise a separate data structure, referred to as a log directory, that keeps track of the location of a record, the version of a record, and other information about each record.

DETAILED DESCRIPTION

In an append-only store of data records, also referred to as a "data log" or simply "log", the data records, or simply "records", are not updated in place. Instead, new versions of records are appended to the log (Data records that are updated may be deleted, or supplemented, or replaced, or otherwise changed in whole or part from their previous state.). Many different types of data can be stored in a log, including records, rows, pages, objects, key-value pairs, and others, but the term "records" can be used to collectively identify any of these types of data. For simplicity, all records can be assumed to be same size, but this is not a requirement of any embodiment and embodiments can apply with records of any size and size combination. A record version that is needed can be referred to as a live record, and in contrast, a record version that is no longer needed can be referred to as obsolete (i.e. dead), and can eventually be discarded.

In an embodiment, a log can be divided into segments and each segment can store at least one data record. As an analogy, each segment is like a physical container in which physical records can be stored. A segment can, for example, be a sequential file or a set of adjacent storage device blocks. Any segment of a log can be allocated and deallocated as needed.

New records and new versions of records can always be written to the head of a log or the head of a log stream, and any part of a log can be read. It should be noted that the meanings of "head" and "tail" can be interchanged, such that in some embodiments, the tail is the extremity where records are appended, and in other embodiments, the head is instead the extremity where records are appended.

Figure 1:
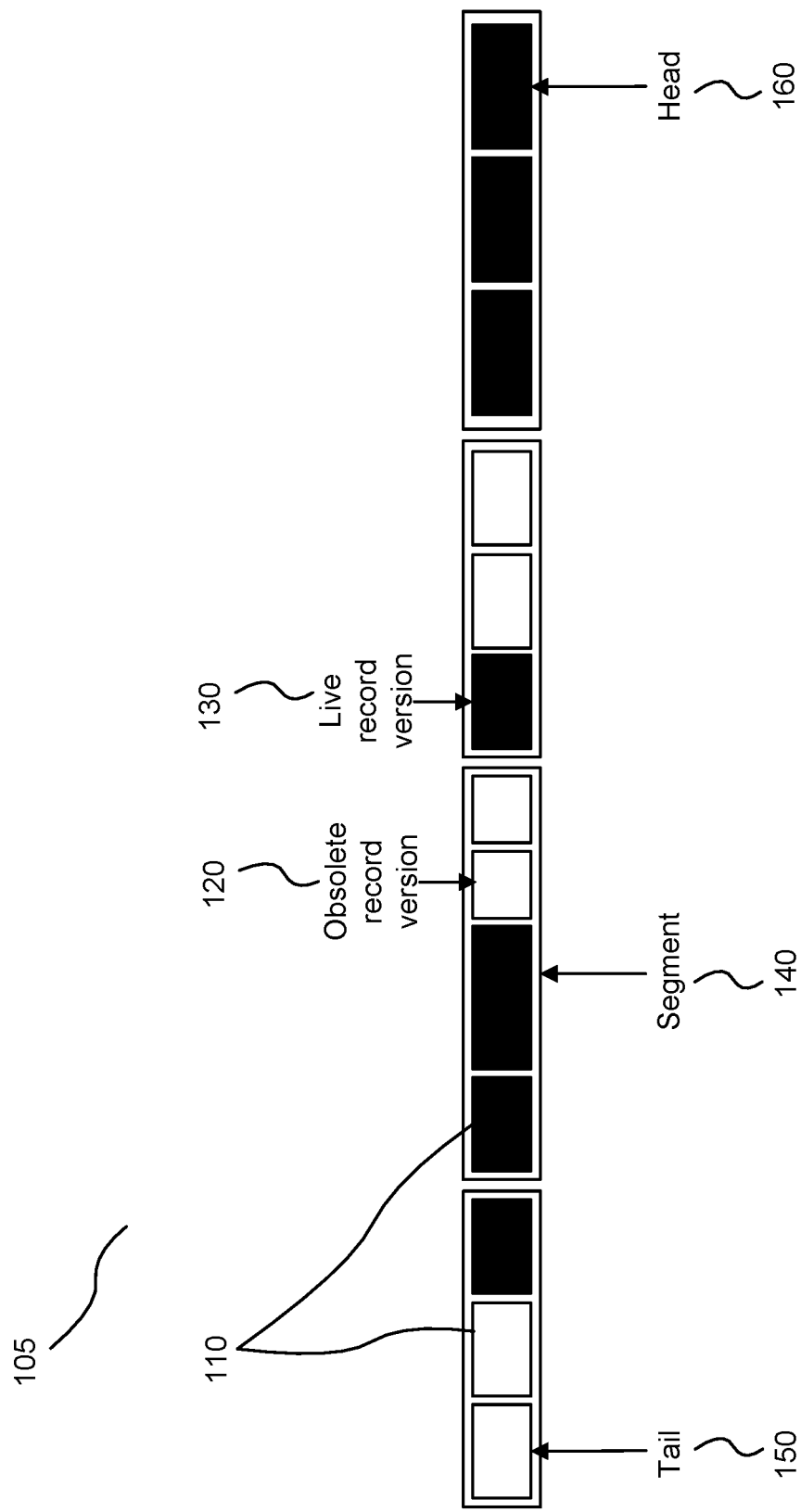
FIG. 1 illustrates a structure of an append-only store of data records and its components, according to an embodiment.

FIG. 1 illustrates a structure of an append-only store of data records, and its components, according to an embodiment. An append-only store of data records, also known as a log 105, can be a string of data records 110. Obsolete versions of records are shown in white 120, and live versions in black 130. A log can be divided into segments 140, and each segment can contain at least one record. The extremities of a log can be referred to as a tail 150 and a head 160.

In an embodiment, a log can contain many streams, each known as a "log stream", or simply a "stream", each stream can include a string of segments, and a new record or version of a record can be appended to any one of the streams.

Each segment of a stream can be scanned, and data records in the segment that are live can be copied to an extremity of the log ("head" or "tail"), while obsolete versions of data records in the segment can be discarded and their space reclaimed. The scanned segment can then be deallocated, thereby reducing the number of segments in, or "compacting", the stream. Such a process can be referred to as either a compaction process or a garbage collection ("GC") process.

An objective of embodiments is to minimize the amount of data written during a compaction process (i.e. garbage collection or "GC"). This is because such minimization can reduce the overhead of a central processing unit (CPU), the input/output (I/O) operations, and the wear on storage devices, such as solid state drives (SSDs).

GC overhead can be measured by "write amplification" (WA), which is the average number of times a version of a record is written before it is discarded during garbage collection. Ideally, WA=1.0, meaning that a version is written once when it is created, and it is never copied until it is discarded during garbage collection. The potential for reducing write amplification (WA) can be significant, especially if the update activity of data records is skewed or if there are many cold records.

To minimize the amount of data written during a compaction process, embodiments can control and adjust the following factors:
  the total memory space budget of a log;
  the number of streams in a log;
  how records can be divided among streams;
  how memory space is distributed among streams;
  which stream segment can be selected for compaction.

Using a moderately skewed data set of 100,000 records, simulated embodiments can produce the following results.
  Log with a single stream: WA=2.63
  Log with 10 streams using a basic compaction policy: WA=1.64 (38% reduction)
  Log with 10 streams using an optimized compaction policy: WA=1.13 (57% reduction)

Noting that a theoretically best possible value for WA is WA=1.11, the above numbers demonstrate benefits of embodiments.

All the records of a log are not updated at the same frequency. Records that are frequently updated and written to can be referred to as hot records, records that are less frequently updated and written to can be referred to as warm records, records that are infrequently updated and written to can be referred to as cool records, and records that are very infrequently updated or written to if at all can be referred as cold records. A record's update frequency can be referred to as the record's "temperature" or "heat". An embodiment can also include intermediate temperature categories besides hot, warm, cool and cold.

The mixing of hot and cold records in a same stream can result in high write amplification and it usually does. The following example can illustrate why. In a single stream in which 1000 hot records and 100 cold records are mixed, the cold records may never be modified, but during compaction, they will nevertheless be copied repeatedly. However, if the cold records are moved to a separate stream, they need not be copied during compaction, and if only records in the stream containing hot records get copied, write amplification can be reduced. In embodiments, a log can be divided into a plurality of streams, and each stream can be associated with a different range of record update frequencies (i.e. "temperatures", as defined herein). As indicated by context, "dividing" can include separating, distributing and/or apportioning, and does not necessarily refer to the mathematical operation of division, nor is there any implication that any division be evenly made.

Embodiments include methods for estimating the update frequency (i.e. temperature) of a record, for determining the range of update frequencies of a stream, for selecting a stream in which to write an updated record, and for optimally dividing a log's space budget among the streams it contains. By sorting records into different streams, based on how frequently each one is updated, (i.e. its "temperature"), an embodiment can allow a reduction in copying during a compaction process, and therefore a reduction in WA.

When a new record version is received, or when a live record version is retained during the compaction of a stream, an embodiment can estimate the record's update frequency (temperature). The record version can then be written to a stream selected based on a range of update frequencies allowed in the stream. Embodiments can estimate a record's update frequency, and how to sort records of different update frequencies (temperatures) into separate streams.

Figure 2:
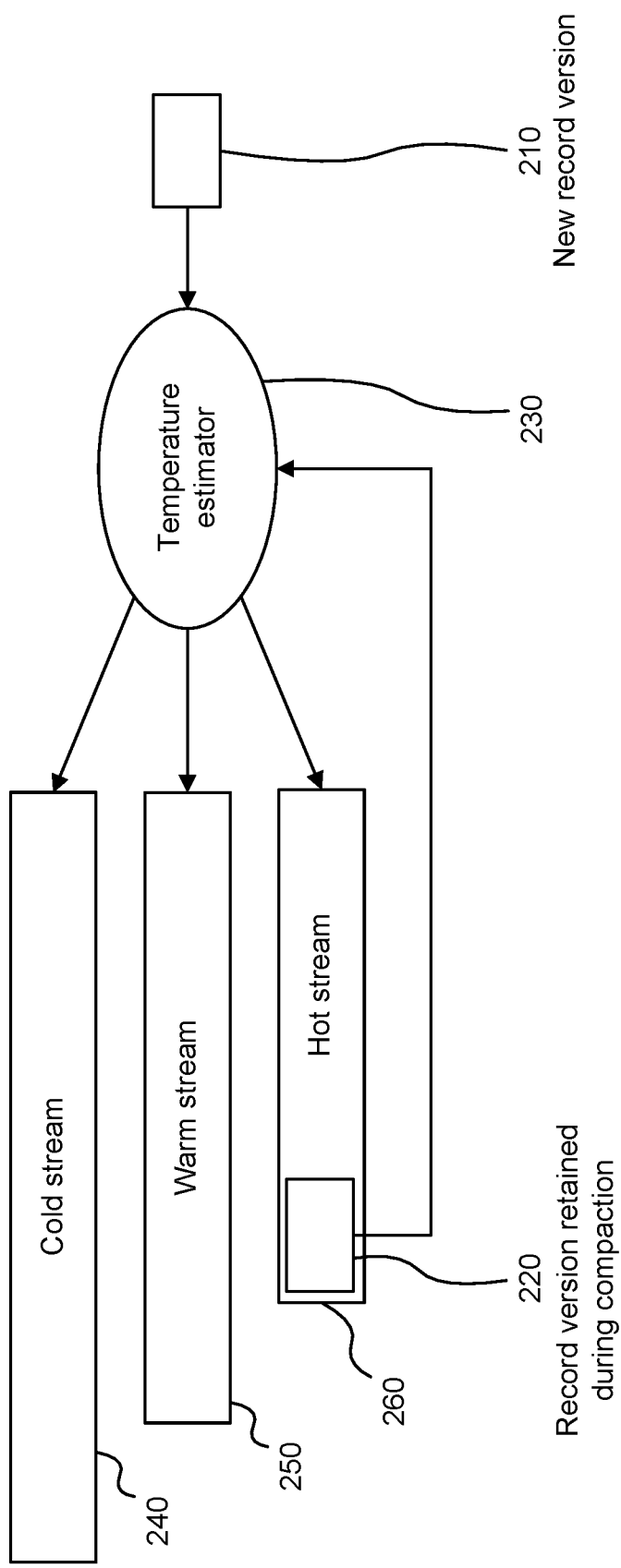
FIG. 2 illustrates an append-only data store with three streams, according to an embodiment.

FIG. 2 illustrates an append-only data store with three streams, according to an embodiment. When a new record version is received 210, or when, during the compaction of a stream, a live record version is retained 220, an update frequency (temperature) estimator 230 can estimate the update frequency of the record, and the record can be assigned to a stream, based on the record's estimated update frequency (temperature). One stream can be for cold records 240, one stream can be for warm records 250, and one stream can be for hot records 260.

Embodiments include methods for estimating the update frequency (temperature) of individual records, and methods for estimating the range of update frequencies (temperatures) of streams. The update frequency of records and streams can be based on the average and the standard deviation in a count of updates, or in a count of "writes", meaning a count of writing occurrences. An embodiment can include an estimator having the following properties:
  high accuracy, in that the determination (i.e. "measurement") of an update frequency can have a low variance;
  little memory space requirement;
  little CPU time requirement;
  quick adjustments to changes in update frequency.

An embodiment can include methods for assigning and writing different records into different streams, based on update frequency criteria, and such methods are described further below. The estimated update frequency of a record can be viewed as unique key that can provide access to a stream.

Embodiments can also include a separate data structure, referred to as a log directory, for keeping track of the location of a record, the version of a record, and other information about each record.

The update frequency of a record P is a measurement of how often it is updated and it can be designated by F(P). However, an update frequency is expressed as a number per second, it is a relative measurement, and it depends on wall clock time. Relative measures complicate statistical calculations such as the computation of the average and the standard deviation.

Therefore, instead of using a data record's update frequency, an embodiment can use the update "distance" $D_i(P)$ of a data record P, which can be defined as the number of writes to records other than P, between successive writes to record P. And alternatively as the number of updates to data records other than data record P, between successive updates to data record P. The distance can be computed as follows. Each write is assigned a sequence number from a monotonically increasing counter. If $W_i(P)$, i=1, 2, 3, . . . denotes the sequence number of the ith write W to record P, then the distance between the ith write to record P and the previous write to record P can be defined as:

$$D_i(P) = W_i(P) - W_{i-1}(P) \quad (1)$$

The value $D_i(P)$ is a random variable and an embodiment can estimate its expected value and variance. The sequence number i of the latest update for each record can be tracked in a log directory.

By defining $D_i(P)$ as such, the dependency on clock time is removed. In embodiments, a shorter average update distance can correspond to a hotter record, i.e. a more frequently updated record, in that the average update distance of a record and the update frequency of a record are inversely related, similarly to the wavelength and frequency of a radio wave.

$$D(P) \propto \frac{1}{F}$$

In an embodiment, an estimation of an update distance can include a calculation of the logarithm of an absolute update distance ln $D_i(P)$. In simpler terms, an estimation (i.e. calculation) of an update distance can use (i.e. include) a logarithm of an absolute update distance. An estimation of an update distance can use the logarithmic update distances between at least one pair of successive updates of the data record received.

In an embodiment, the average update distance and the average logarithmic update distance between updates to a record P can be estimated using an exponentially weighted moving average (EWMA) with parameter α between 0 and 1 (0<α<1). Parameter α is a smoothing constant for the EWMA and it can typically lie in the range from 0.05 to 0.10. An estimated update distance can be (for example) any of an update distance, an average update distance, a moving average update distance, a logarithmic update distance, an average logarithmic update distance, a moving average logarithmic update distance, an EWMA update distance, and an EWMA logarithmic update distance.

In an embodiment, the EWMA of the logarithmic update distance of a record P, after update i to record P can be denoted as $X_i(P)$. Even when there are only a few observations, an EWMA $X_i(P)$ can be computed recursively as follows, which is a computation yielding an unbiased estimate:

$$Y_1(P) = \alpha \ln[D_1(P)]$$

$$Y_i(P) = \alpha \ln[D_i(P)] + (1-\alpha) Y_{i-1}(P), \, i = 2, 3, 4, \ldots$$

$$X_i(P) = \frac{Y_i(P)}{1 - \beta^i}$$

where $\beta = 1 - \alpha$ and $\alpha < 1$. The $1 - \beta^i$ term is the sum of the weights of the first i terms of $Y_i(P)$. Dividing by the β term ensures that the weights add up to one. As the update sequence number i increases, the $(1-\beta^i)$ term converges to one.

Figure 3:
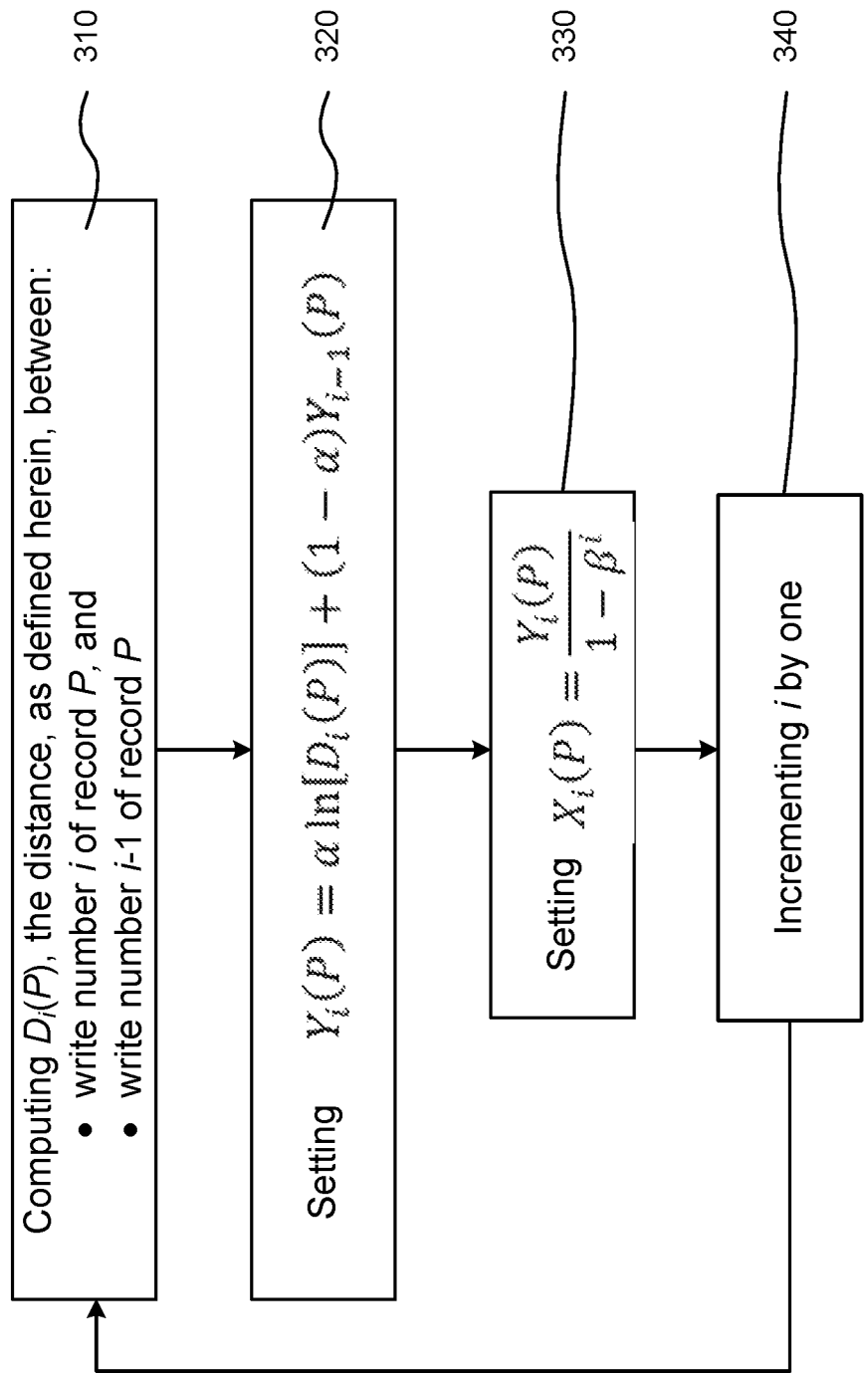
FIG. 3 is a flow chart illustrating steps for computing an exponentially weighted moving average (EWMA) of the logarithmic update distance of a record P.

FIG. 3 is a flow chart showing steps for computing an exponentially weighted moving average (EWMA) of the logarithmic update distance of a record P. In an initial step, an update distance $D_i(P)$ for record i can be computed 310. Then, a $Y_i(P)$ factor can be set 320, and if i=1, then a computation can use $Y_0(P)=0$. Each corresponding EWMA $X_i(P)$ can be set 330, and then incrementing i by one 340 can allow subsequent $Y_i(P)$ factors and EWMA $X_i(P)$ to be computed successively.

In an embodiment, the choice of a parameter α can be a trade-off between the variance of EWMA $X_i(P)$ estimates, and how rapidly EWMA $X_i(P)$ estimates react when a record cools down or heats up (i.e. when an average update distance changes). A variance $V_i[X_i(P)]$ of an EWMA $X_i(P)$ estimate can be:

$$V_i[X_i(P)] = \frac{\alpha}{2-\alpha} \frac{1-\beta^{2i}}{(1-\beta^i)^2} V(\ln[D(P)])$$

As an update sequence number i increases, the variance converges to:

$$\lim V_i[X(P)] = \frac{\alpha}{2-\alpha} V(\ln[D(P)])$$

An EWMA $X_i(P)$ estimate can be compared with that of a standard moving average (MA) that assigns equal weight to each term. A standard MA with n terms reduces the variance by a factor of $$\frac{1}{n}$$

and an EWMA with a smoothing constant α reduces the variance by a factor of $$\frac{\alpha}{2-\alpha}.$$

Equating the two factors and solving for n yields that $$n = \frac{2-\alpha}{\alpha}.$$

Therefore, an EWMA $X_i(P)$ estimate in which parameter is α=0.05, results in a similar smoothing effect as a MA with 39 terms.

In embodiments, records can be sorted into different streams, based on their average logarithmic update distances. To select which stream each record should be assigned to, the record's average logarithmic update distance can be compared with the range of average logarithmic update distances assigned to a stream. A record can then be assigned to the most appropriate stream.

During the course of an embodied method, at any given point in time, a stream can host a subset of a total set of records. To verify whether a record's update distance is a good match for a given stream, an average logarithmic update distance of the record can be estimated, as well as a related standard deviation, and both can be computed using an EWMA method.

Besides calculating EWMA statistics for a selected record, EWMA statistics can also be used for the many records stored in a selected stream S. If the sequence number i refers to a record in a stream S (as opposed to an update of a record P as above), then:

- an average logarithmic update distance of records in a stream S can be denoted by $X_i(S)$ (as opposed to $X_i(P)$ as above),
- an EWMA of the square of observed logarithmic update distances between records in a stream S can be denoted as $Q_i(S)$,
- a related variance for the records in a stream S can be noted by $V_i[X_i(S)]$, (as opposed to $V_i[X_i(P)]$ as above), and
- a related standard deviation for a stream $S_i$ can be denoted by $S_i(S)$.

In an embodiment, a recursive formula for an average logarithmic update distance $X_i(S)$ of records in a stream S can be similar to a formula for an average logarithmic update distance $X_i(P)$ of updates of an individual record, and the EWMA of the square of the observed logarithmic distances for records in stream S, $Q_i(S)$, can also be computed. A variance $V_i[X_i(S)]=V_i(S)$ can then be computed using $X_i(S)$ and $Q_i(S)$.

In an embodiment, $X_i(S)$ and $Q_i(S)$ can be updated whenever a record p in a stream S is updated. The calculation of an average logarithmic update distance $X_i(S)$ can be as follows:

$$Y_1(S) = \alpha \ln[D_1(P)]$$

$$Y_i(S) = \alpha \ln[D_i(P)] + (1-\alpha)Y_{i-1}(S), i = 2, 3, 4, \ldots$$

$$X_i(S) = \frac{Y_i(P)}{1-\beta^i}$$

The calculation of the variance $V_i(S)$ for the EWMA of the square of observed logarithmic update distances between writes to records in a stream S can be:

$$Q_1(S) = \alpha(\ln[D_1(P)])^2$$

$$Q_i(S) = \alpha(\ln[D_i(p)])^2 + (1-\alpha)Q_{i-1}(p), i = 2, 3, 4, \ldots$$

$$V_i(S) = \frac{Q_i(S)}{1-\beta^i} - X_i^2(S)$$

And the standard deviation $S_i(S)$ is therefore:

$$S_i(S) = \sqrt{\frac{Q_i(S)}{1-\beta^i} - X_i^2(S)}$$

Figure 4:
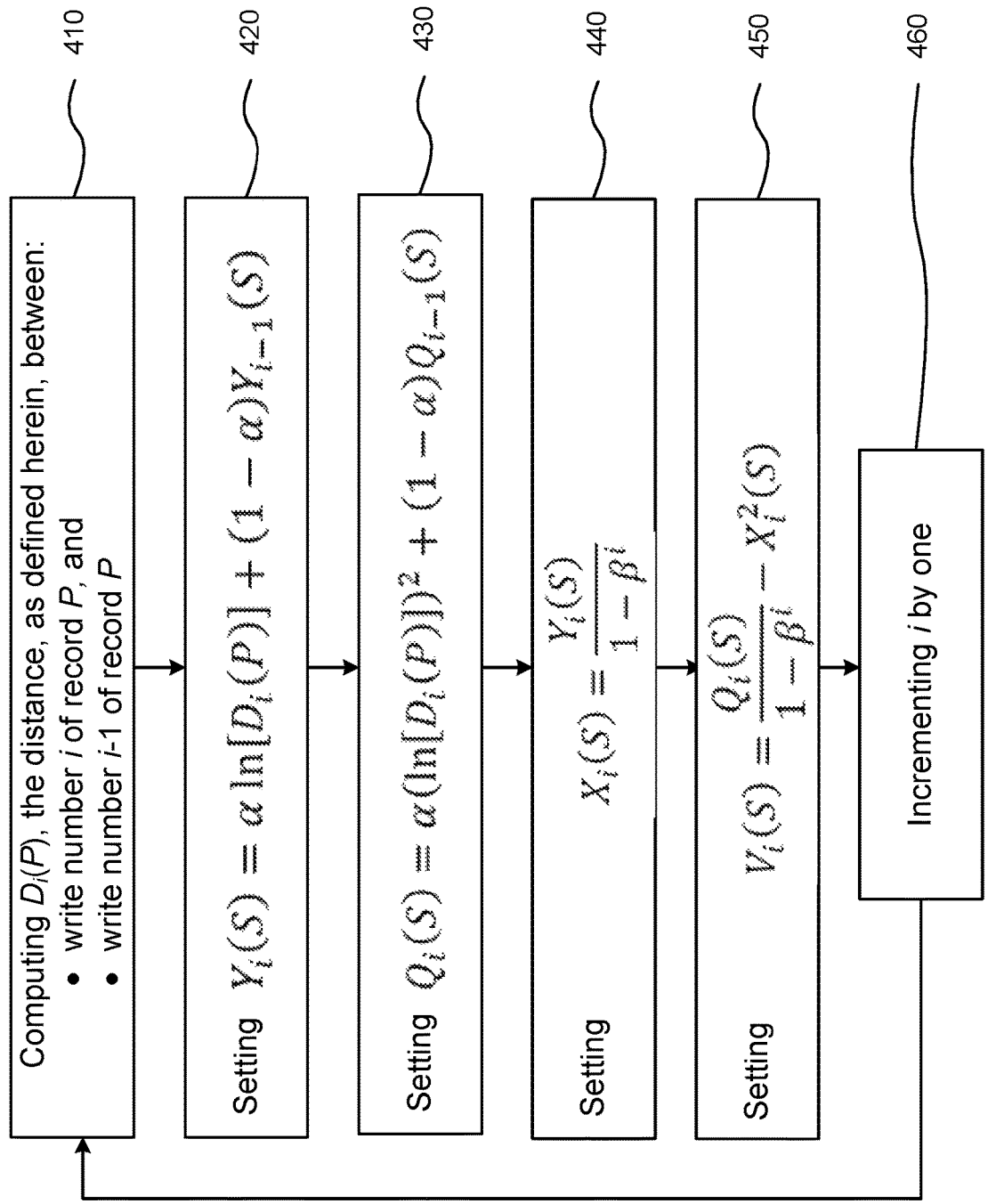
FIG. 4 is a flow chart illustrating steps for computing an exponentially weighted moving average (EWMA) of the logarithmic update distance of records in a stream S, and the variance thereof, according to an embodiment.

FIG. 4 is a flow chart illustrating steps for computing an exponentially weighted moving average (EWMA) of the logarithmic update distance of records in a stream S, and the variance thereof, according to an embodiment. An initial step can be to calculate an update distance $D_i(P)$ for a record P in the stream S 410. Then, the result can be used to calculate a $Y_i(S)$ factor 420, which can in turn be used to calculate $Q_i(S)$, an EWMA of the square of observed logarithmic update distances between updates to records of the selected stream 430. The $Y_i(S)$ factor can also be used to calculate an EWMA $X_i(S)$ 440, and the variance 450. The process can be repeated for each update by incrementing i by one 460.

Embodiments that include the above methods can be used for estimating an average logarithmic update distance of records, an average logarithmic update distance of streams, and a variance of the logarithmic update distances in a stream.

A stream S can be defined by a range of update distances or logarithmic update distances, and either of these ranges can be denoted as $[L_S, U_S)$, where $L_S$ is a lower bound and $U_S$ is an upper bound. Any record P whose estimated update distance or function thereof falls within the range $[L_S, U_S)$ can be assigned to stream S.

Embodiments can include at least two methods for defining a range defining a stream S. A first method can use fixed bounds and a second method can use variable bounds. In an embodiment, a record assigned to a stream $S_1$ can be switched to another stream $S_2$ when a record is written, which can occur when a new record is written, when an existing record is updated, or when an existing record is copied during compaction.

Embodiments can include the partitioning of stored records based on their update distances, and the use of streams and partitions having exponentially spaced boundaries. If using the natural logarithm ln(x), also noted as $\log_e(x)$, exponentially spaced boundaries of a stream's range of update distances translate into equally spaced boundaries on the logarithmic scale. In an embodiment, an increase of boundaries by a factor of 4 on the absolute scale corresponds to an increase of boundaries by a factor of approximately ln(4)=1.3863 on the natural logarithmic scale. In some embodiments, ten (10) streams with properly selected boundaries can provide enough separation.

Figure 5:
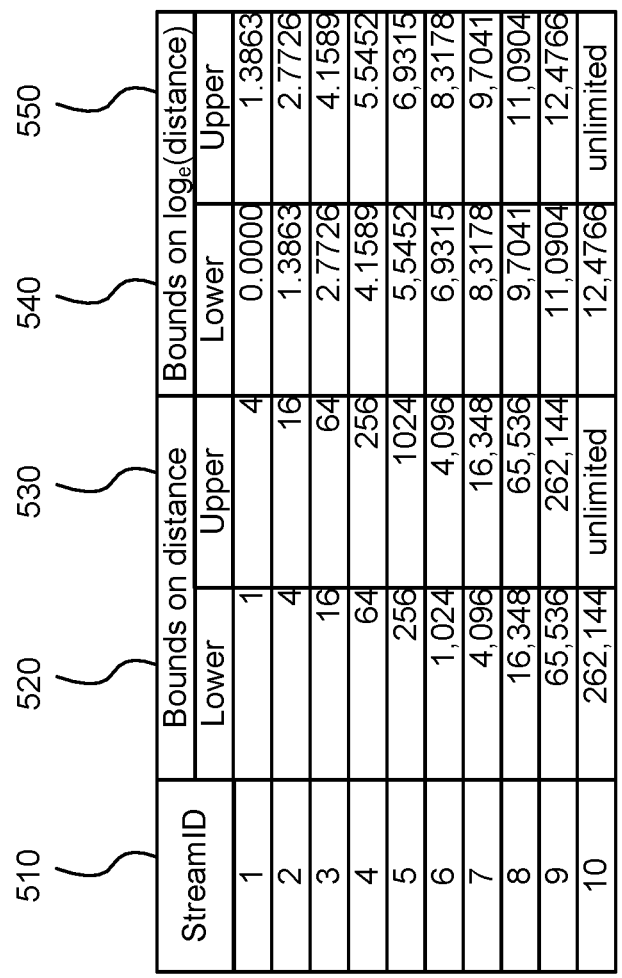
FIG. 5 is a table showing the boundaries of a range of update distances, as defined herein, for 10 streams storing records, presented on both an absolute and a natural logarithmic scale, according to an embodiment.

FIG. 5 is a table showing the boundaries of a range of update distances, as defined herein, for 10 streams storing records, presented on both an absolute and a natural logarithmic scale, according to an embodiment. Each stream is identified with a number from 1 to 10 and presented in a first column 510. Each stream can receive and store a record having an update distance, or function thereof, within the stream's range. The lower bound of each stream's range is shown in the second column 520 and the upper bound of each stream's range is shown in the third column 530. The same bounds are also shown in a natural logarithmic scale, the lower logarithmic bound being in the fourth column 540 and the upper logarithmic bound being in the fifth column 550.

In embodiments, the use of streams defined by fixed boundaries can be straightforward. However, to prevent partitions that are so rigidly defined as to be insensitive to the actual data, an embodiment can include an approach by which the number of partitions and their boundaries can depend on the observed behavior of the data received and stored, and automatically adjust to changes in data characteristics, such as its update distance or function thereof.

In an embodiment, a record P can be assigned to stream S. When P is updated, an embodiment can select whether to append the new version of P to stream S, or to some other stream. To do so, an embodiment can first update the EWMA logarithmic update distance $X_i(P)$ of a record, and then it can check whether the updated EWMA $X_i(P)$ falls within a range centered on an EWMA $X_i(S)$ for stream S, and bounded by a standard deviation of EWMA $X_i(S)$, from the range's center, or a multiple c thereof. Expressed more precisely, an embodiment can verify whether the estimated update distance $X_i(P)$ of a record satisfies the following condition:

$$[X_i(S)-cS_i(S)] \leq X_i(P) \leq [X_i(S)+cS_i(S)] \quad (C1)$$

In an embodiment, if the estimated update distance $X_i(P)$ of a record does satisfy condition C1, the record can be allocated to, or can remain in, stream S. Otherwise, it cannot. In other words, the lower bound L(S) and the upper bound U(S) of a range of average update distances assigned to a stream can be:

$$L(S)=X_i(S)-c\sqrt{V_i(S)}$$

$$U(S)=X_i(S)+c\sqrt{V_i(S)}$$

A similar rule can apply when a live version of a record P needs to be copied during a compaction process. In an embodiment, a condition C1 can be defined with a multiplier c=1.96, which, for normally distributed data, corresponds to a 95% confidence interval.

If the estimated update distance $X_i(P)$ of a record does not satisfy a condition C1 as defined in an embodiment, a neighbouring stream, such as the stream with a higher range, or a stream with a lower range, can be verified. If there is no appropriate stream, an embodiment can create a new stream having a proper range, and write the record version to it. In some embodiments, a new stream can be created under conditions such as:

If the number of streams remains less than maximum number of streams, then a new stream can be created. In an embodiment, an upper bound to the total number of streams in a log can be 10 streams.

If the estimated update distance and a related standard deviation of a stream are calculated using a minimum number of records in the stream, then a new stream can be created. In an embodiment, a minimum number of records can be 10.

In an embodiment, if a stream contains less than a set minimum number of records, it can be merged (i.e. combined) with another stream, such as a neighboring stream, to form a new stream including the two neighboring streams and replacing them. In an embodiment, a minimum number of records in a stream can be set to five records.

In embodiments, when further versions of records are appended to streams, memory space consumption can grow. Periodically, stream storage can be compacted by a compaction process (i.e. garbage collection or GC), which refers to discarding versions of records that are no longer needed. A compaction process can be triggered under user-defined conditions and can include: copying live records of a segment to the head of the same or another stream, and discarding a segment storing at least one obsolete data record. In an embodiment, a compaction process can scan one segment at a time, select a segment containing versions of records that are no longer needed (i.e. "obsolete", or "dead"), and write each live record version in the segment, to the most appropriate alternate stream. Once the live records have been copied and written to storage, the segment containing versions of records that are no longer needed can be deleted and its memory space can be freed or reallocated. A segment selected to be deleted can be referred to as a "victim" segment.

In an embodiment, several versions of a record can be stored in a stream. Some versions of a record can be live and must be kept, while others, can be obsolete, are no longer needed, and can be discarded. Space inflation is defined as the total memory space used, divided by the memory space occupied by the live versions of records. A compaction process can be triggered under user-defined conditions, such as when memory space inflation exceeds a limit set by a user of an embodiment.

For dividing memory space among streams, for triggering compaction, and for selecting a segment containing obsolete record versions, embodiments can use either one of at least two different policies, that differ in how such division, triggering and selection can be performed. Each one of the at least two policies can have two variants: one variant using streams with fixed boundaries for a range of update distances or functions thereof, and one variant using streams with variable boundaries instead. Regardless of an embodiment's policy, the steps of a compaction process can be similar.

Figure 6:
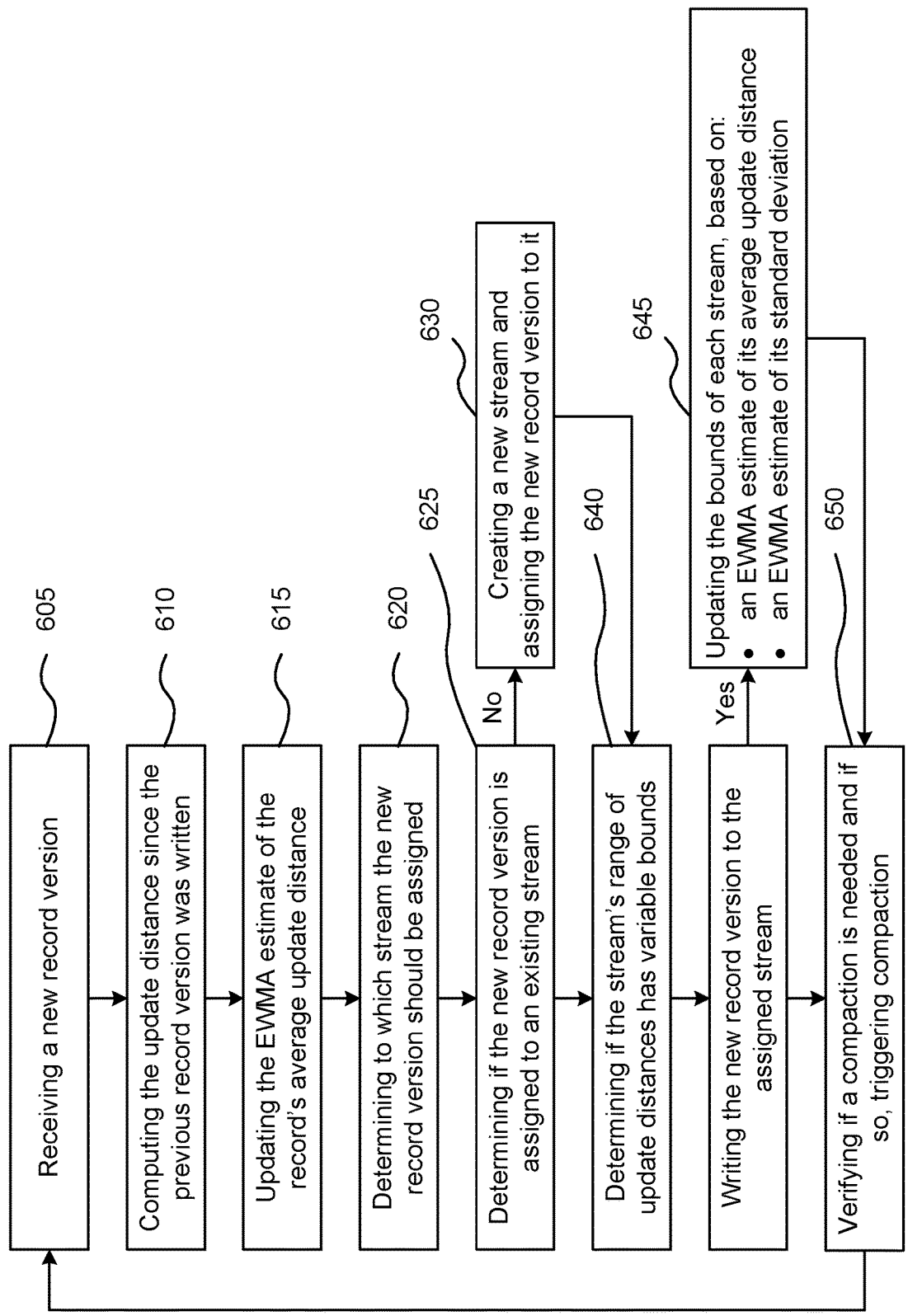
FIG. 6 is a flow chart illustrating steps for writing a new version of a record in an append-only store, according to an embodiment.

FIG. 6 is a flow chart illustrating steps for writing a new version of a record (i.e. an updated record) in an append-only store, according to an embodiment. An initial step can be to receive a new record version 605. Then, the update distance since the previous record version was written can be computed 610, as well as related statistical information, such as an updated EWMA 615, updated variance, and updated standard deviation. Using the results, a stream can be assigned for the new record version 620. If the new record cannot be assigned to an existing stream 625, a new stream can be created 630. If a stream can be assigned 625, and the stream has variable bounds 640, the statistical information for the stream can be updated, including an EWMA of the upper and lower update distance bounds, and a related standard deviation 645. A latter step can be to verify whether a compaction process should be executed, and triggering if needed 650.

In an embodiment, a compaction policy can be based on a global view of the append-only store, and have a global space budget for the log, or a log with a set memory limit, and not explicitly divide space among the streams. A user can set a global memory limit for the log, and a compaction process can be triggered if the overall memory space inflation due to received record versions exceeds the global memory limit specified by a user. In an embodiment, such a limit can be 150%. A segment can be selected for compaction if among all the segments and across all the streams, that segment contains the fewest number of live versions.

In an embodiment, during a compaction process, when a live version of a record is found, the process can select to which stream it can be assigned, or should be assigned. A selection can depend on how many streams are available, and on the range of update distances allowed in each stream. As discussed previously, the streams of an embodiment can be described in at least two ways: one where each stream can store records having an update distance in a range that is fixed, and one where a range is variable instead.

In an embodiment, the stream to which a record is assigned can be determined using an estimated update distance of the record, including any of an update distance as defined herein, an average update distance, a moving average update distance, a logarithmic update distance, an average logarithmic update distance, a moving average logarithmic update distance, an EWMA update distance, and an EWMA logarithmic update distance. When a new version of a record is written, the estimated update distance can itself be updated, and thus include the latest information regarding the update distances of records received. However, when, during compaction, a record is copied to another stream, its estimated update distance can be out of date, and the record can be assigned to a wrong stream.

An embodiment can resolve as follows the problem of assigning a record to a wrong stream because of an out-of-date update distance estimation. If a record P was initially written when $W_{i-1}(P)=100$, and the next update occurs when $W_i(P)=200$, an estimated update distance is:

$D_i(P)=200-100$ $D_i(P)=100$ and:

$\ln[D_i(P)]=4.605$

If the stream where record P resides is not selected for compaction until when $W_{i+1}(P)=10,000$, the estimate based on when $W_i(P)=200$ is clearly much too low. Indeed, the distance for a next update would be at least:

$D_{i+1}(P)=10,000-200$ $D_{i+1}(P)=9800$ and:

$\ln[D_{i+1}(P)]=\ln[9800]$ $\ln[D_{i+1}(P)]=9.190$

With an embodiment using the latest information however, an estimate can be revised and the record P can be assigned based on the revised estimate. If a revised estimate is 6.596 on the logarithmic scale, this corresponds to $D_{i+1}(P)=1049.0$ on the non-logarithmic scale, which is a better estimate than $D_{i+1}(P)=9800$. Note that an estimate stored for record P is not necessarily updated; a revised estimate can be computed simply to assigning a record to a stream.

In an embodiment, a policy with a global memory limit can be applied to a log having a fixed number "MaxStreams" of pre-allocated streams, and each stream can be identified with a number "StreamNr", from 0 to "MaxStreamNr" (MaxStreamNr=MaxStreams−1). Streams can be spaced apart by a number StreamWidth, such that a record with an estimated update distance Y can belong to a stream floor (i.e. extremity) identified by a number Y/StreamWidth. In an embodiment, parameter values can be:

α=0.05

StreamWidth=ln(4)

MaxStreams=10

MaxStreamNr=MaxStreams−1=9

In an embodiment, when a record has been updated and the update record version is ready to be written, a method can include: updating the fields related to EWMA statistics in a descriptor of the record; computing a newly estimated update distance, and using the newly estimated update distance to determine which stream the updated record version should be written to. The stream so determined can be referred to as a target stream. If the streams are numbered from 0 to MaxStreamNr−1, a target stream's number StreamNr can be computed as:

$$StreamNr = \min\left[\text{floor}\left(\frac{EstDist}{StreamWidth}\right), MaxStreamNr\right]$$

where EstDist is a record's estimated update distance.

During compaction, when a live version of a record is about to be written, the estimated update distance for the record can be revised, but it is not necessary, or necessarily useful, for the record's descriptor to be updated. The record version can be assigned to a stream based on the revised estimate.

In an embodiment, a compaction process can require setting for each stream a range of update distances that is fixed, and in another embodiment, a compaction process can require streams having a range of update distances that is determined by the records assigned to each stream. Such an embodiment can use streams storing records with update distances in a range of update distances that is variable and based on the update distances of the records received and stored in the streams. A compaction processes with streams having a variable range, can be an alternative to one with streams having a fixed range, and a compaction process can be triggered based on whether a stream has sufficient memory to store the records assigned to it. If a record's estimated update distance is too high to fit any of the existing streams, a compaction process can create a new stream and the total number of streams can be limited by an embodiment. A stream containing less than a minimum number of records can be merged with a neighboring stream. The number of records in a stream can remain between an upper limit and a lower limit defined by an embodiment, and the number of streams in a log can also remain between an upper limit and a lower limit defined by an embodiment. Further, if none of the existing streams has a range of update distances that includes the estimated update distance of a live record, a new stream can be created, and if one of the existing streams stores less than a set minimum number of records, two streams can be merged.

At any point in time, an append-only store according to an embodiment can contain a sequence of streams, ordered by the estimated update distances of the records stored within. When a record is updated, its estimated update distance can also be updated, and the updated estimate can be used to determine the stream to which the new record version should be written. A record can be written to stream StreamNr if the difference between its estimated update distance and the average update distance in stream StreamNr is within a multiplier c times the standard deviation of average update distances in stream StreamNr. In an embodiment, c can be a multiplier such as c=1.96, which is the 95% confidence interval of a normal distribution. If the difference is outside c times the standard deviation, an embodied method can verify the range of update distances of a neighboring stream, until the most appropriate stream is found for the record. If no stream is appropriate, a new stream can be created provided that the total number of streams remains below a user-defined upper limit. To prevent a stream from containing too many records or too few, limits on the number of records in each stream can be defined and if a limit is exceeded, neighboring streams can be merged or split, respectively. In an embodiment, a minimum number of records in a stream can be labelled MinStreamSize and it can be set to five records. However, before any two streams are merged, their estimated update distances should have had a chance to stabilize, by including a minimum number of writes. In an embodiment, a stream is not merged until its number of writes, which can be labelled "CurrentCount", is 40.

Figure 7:
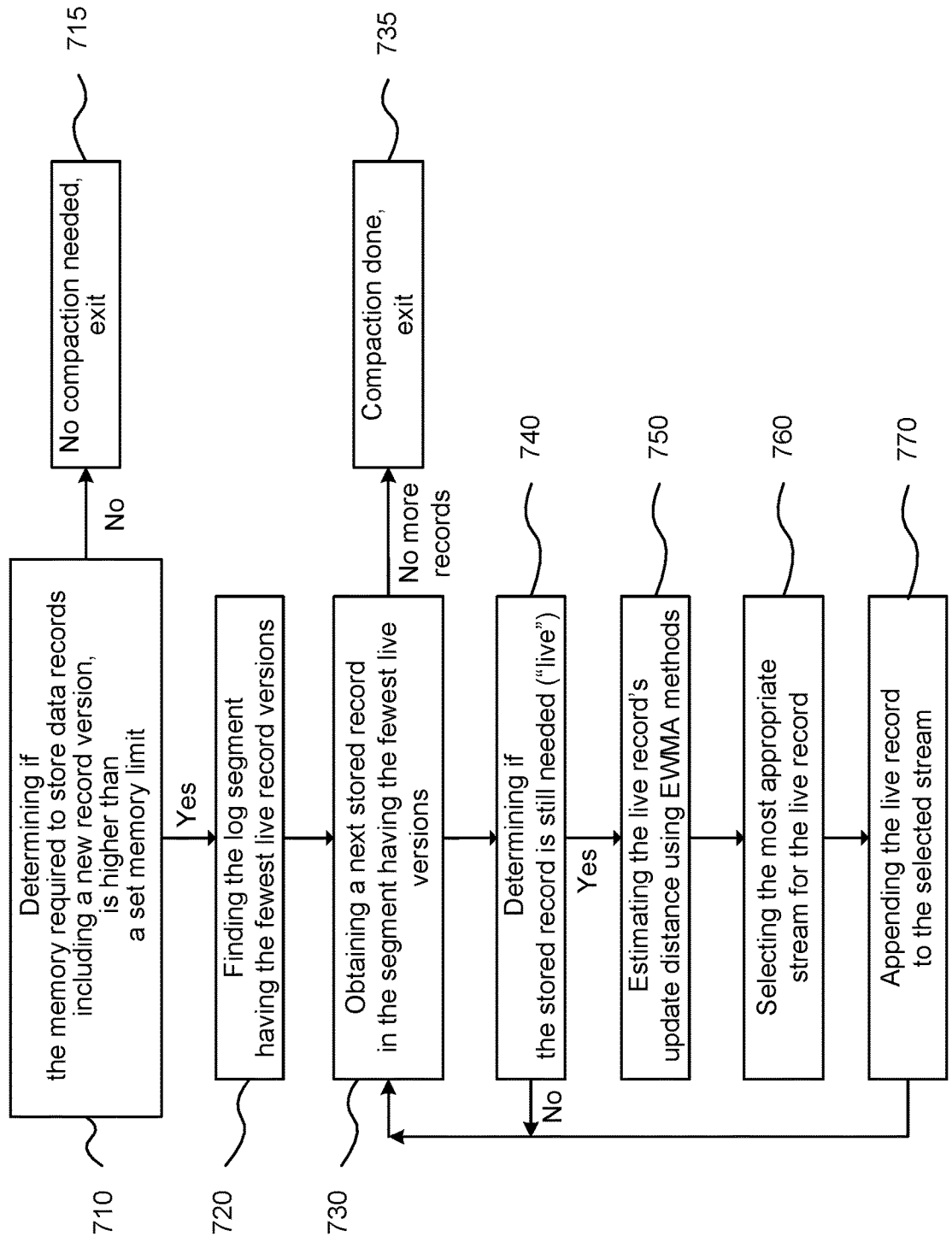
FIG. 7 is a flow chart of a compaction process for an append-only store, according to an embodiment where a compaction process is based on a set limit on total memory space.

FIG. 7 is a flow chart of a compaction process for an append-only store, according to an embodiment where a compaction process is based on a set limit on total memory space. A first step of a method can be to determine if the memory required to store data records, including a new record version, is higher than a set memory limit 710. If not, no compaction is needed and the compaction process can end 715. A next step can be to find in the streams, the segment having the fewest live versions of records 720. Then, a stored record of that segment can be obtained 730. If no stored records are left to be obtained, the compaction process can end 735. If there is a next stored record, the process can determine if the stored record is live (i.e. it must not be discarded) 740, and it can estimate the stored record's update distance by using EWMA methods 750. Then, the process can select for each live record of the segment, the stream having a range of update distances that includes the update distance of the live record, based on the live record's update distance as estimated using EWMA methods 760, and a final step of the process can be to append the live record to the selected stream 770.

A compaction process according to an embodiment, where stream boundaries are determined by record update distances can separate records into different streams, based on how frequently each record is updated. A compaction process can be triggered when the memory space being used expands beyond a set limit, and the segment with the fewest live records can be selected for compaction, regardless of which stream it belongs to. Such a compaction process can reduce write amplification significantly. However, it does not necessarily minimize write amplification but can tend to starve hot streams for memory space.

In an embodiment, an append-only store and a compaction process can use a set memory limit for each stream, instead of, or in addition to, a set memory limit for the append-only store as a whole. An append-only store can also use a variable number of streams, and the number of streams can depend on the update distances of the record versions received and stored in the streams. An append-only store according to an embodiment can use a triggering condition based on whether the memory required, to store the records having an update distance with a same range, exceeds a set memory limit for the stream having that range. In other words, each stream can be allocated a memory space budget, and a compaction process can be triggered when its memory usage exceeds its budget. With such an embodiment, a total memory space budget can be divided optimally among streams, in a way that minimizes an expected write amplification (WA).

Figure 8:
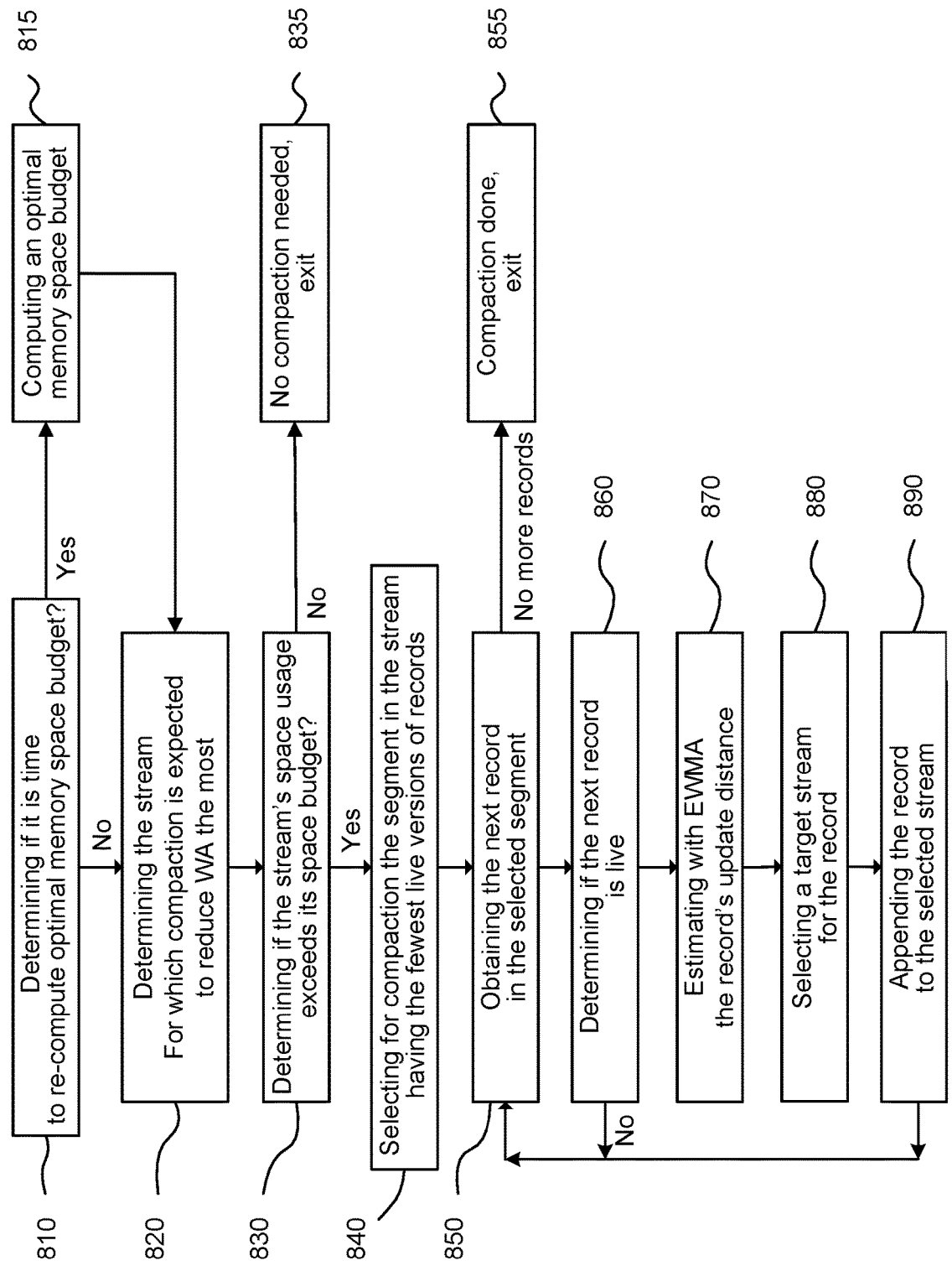
FIG. 8 is a flow chart of a compaction process for an append-only store, according to an embodiment where a compaction process is based on memory usage being optimally allocated among the streams.

FIG. 8 is a flow chart of a compaction process for an append-only store, according to an embodiment where a compaction process is based on memory usage being optimally allocated among the streams. An initial step for updating a record can be to determine if it is time to re-compute an optimal space budget 810, and to do so as needed 815. Then, a step can be to find the stream where compaction is expected to reduce write amplification (WA) the most 820. If the stream's memory space usage doesn't exceed its memory space budget 830, no compaction is needed and the process can terminate 835. If it does 820, then the segment of the stream having the fewest live versions of records can be selected for compaction 840. Then, an embodiment can obtain the next record in the selected segment 850, unless there is none left, in which case the process can terminate 855. For each of the subsequent records, it can be determined if the record is live 860, and if so, its update distance can be estimated using an EWMA method 870. A target stream for the record can be then selected based on their respective range of update distances, and update distance 880. The record can finally be appended to the selected stream 890 and the process repeated for every other record 850. The process can be iterated to select for each live record of the segment, the stream having a range of update distances that includes the update distance of a live record, based on the live record's update distance as estimated using EWMA methods.

In an embodiment having a total number n of streams, each stream i can be assigned a number of records $p_i$, and the fraction of writes to stream i, relative to the total number of writes to all streams, can be denoted by $w_i$. The records assigned to a stream can all equally be likely to be updated and written. If a total memory space budget is M, where M is greater than the total number of records ($M > p_1 + p_2 + \ldots + p_n$), the memory space used by a stream i is $x_i p_i$, where $x_i$ denotes a space inflation factor for stream i.

In an embodiment where a function F(x) can compute the probability that the "oldest" (i.e. earliest) version of a record has not been updated and written, in a stream where memory space inflation is x, then wF(x) can be the expected fraction of live versions written, when the stream is compacted. If a stream hosts a number p of distinct records, the total number of versions equals xp. The term "oldest" refers to the record version that is furthest back in the stream.

In an embodiment, an expected write amplification (WA) can be minimized across all the streams by using the function:

$$G(x_1, x_2, \ldots, x_n) = w_1 F(x_1) + w_2 F(x_2) + \ldots + w_n F(x_n) \qquad (1)$$

subject to the conditions:

$$x_1 p_1 + x_2 p_2 + \ldots + x_n p_n \leq M$$

$$x_1 \geq, x_2 \geq 1, \ldots, x_n \geq 1$$

Eq. 1 is a well-defined optimization problem in which F(x) can be.

$$F(x) = \frac{-W(-xe^{-x})}{x}$$

where W is known as the Lambert W function. The Lambert W function has no explicit form but it can readily be computed numerically. In an embodiment, the G ($x_1$, $x_2$, ..., $x_n$) function can be optimized numerically using, among other methods, a gradient descent method.

In an embodiment, the optimal division of memory space among streams can be recomputed periodically. A compaction process periodically computing the optimization problem of optimally dividing memory usage among the streams, by minimizing write amplification across all the streams, can gradually converge towards optimal memory divisions. Concurrently, the fraction of writes for each stream needs to be estimated and this can also be done using a EWMA calculation. For each stream, the number of writes can be counted between re-optimizations and a EWMA can be computed. Then, for each stream, the fraction of writes can readily be computed.

In an embodiment of a compaction policy with fixed boundaries or variable boundaries, re-optimization can be triggered periodically after 10,000 compactions, and a resulting writing amplification (WA) can be very close to the theoretical minimum.

Embodiments include methods to estimate the update distance of a record, the range of update distances for a stream, and the standard deviation of update distances in a stream, using a EWMA that produces accurate, efficient, and statistically sound estimates.

Embodiments include the use of methods for selecting which stream an updated record should be written to and writing the updated record into the selected stream, the method being based on estimating an update distance for each record.

Embodiments include methods for computing the allocation of a memory space budget for streams, that can minimize the expected write amplification and that can perform compactions to gradually converge towards a target allocation.

Embodiments include a method for updating a data record stored in an append-only store, comprising: dividing into streams the append-only store, each stream designated to store at least one data record having an estimated update distance within a range of update distances, that is specific to the stream; receiving a data record; estimating the update distance of the data record; selecting in the append-only store, a stream having a range of estimated update distances that includes the estimated update distance of the data record; and writing the received data record to the selected stream; wherein the estimated update distance of a data record P is substantially a function of the number of updates to data records other than data record P, between successive updates to data record P. In embodiments, estimating the update distance of a data record can comprise computing the logarithmic update distance between at least one pair of successive updates of the data record received; and computing the exponentially weighted moving average (EWMA) of the logarithmic update distance, using the logarithmic update distances between the at least one pair of successive updates of the data record received. In embodiments, selecting a stream can comprise, for each stream: computing the logarithmic update distance between at least one pair of successive updates of a data record in the stream; computing the exponentially weighted moving average (EWMA) of the logarithmic update distance, using the at least one pair of successive updates of a data record in the stream; computing the exponentially weighted moving standard deviation of the logarithmic update distance, using the at least one pair of successive updates of the data record in the stream, and selecting a stream based on the exponentially weighted moving average (EWMA) of the logarithmic update distance, and the exponentially weighted moving standard deviation of the logarithmic update distance. In embodiments, a range of estimated update distances that is specific to a stream can have fixed bounds. In embodiments, the fixed bounds of a range of estimated update distances can be equally spaced on a logarithmic scale. In embodiments, a range of estimated update distances that is specific to a stream can have variable bounds. In embodiments, a method can further comprise writing the data record to the stream, if the estimated update distance of the data record is within a factor of the standard deviation from the estimated update distance in the stream; verifying a neighbouring stream, and assigning the data record to the neighbouring stream, if the estimated update distance of a data record is within a factor of the standard deviation from the estimated update distance in the neighbouring stream; creating a new stream, if the estimated update distance of a data record is outside a factor of the standard deviation from the estimated update distance in any stream; and merging a stream with another stream, if either stream contains less than a set minimum number of data records. In embodiments, conditions for creating a new stream can further include the number of streams remaining less than a set maximum number of streams; and the estimated average logarithmic update distance and standard deviation in a stream being calculated using at least a set minimum number of updates in the stream. In embodiments, a method can further include dividing each stream into at least one segment, each segment storing at least one data record, and performing a compaction process that is triggered under user-defined conditions; and that comprises copying live records from one segment of a stream to another stream, and discarding a segment storing at least one obsolete data record; where a live record is a data record that is not obsolete and that must not be discarded. In embodiments, a compaction process can further include: using an append-only store having a set memory limit; using a triggering condition based on whether the memory required to store the data records exceeds the append-only store's set memory limit; finding in the streams, the segment having the fewest live versions of data records; selecting for each live record, of the segment having the fewest live versions of data records, the stream having a range of average logarithmic update distances that includes the average logarithmic update distance of the live record, based on the live record's average logarithmic update distance as estimated using EWMA methods; and appending the live record to the selected stream. In embodiments, a compaction process can further comprise using streams that store data records having estimated update distances, in a range of estimated update distances that is fixed. In embodiments, a compaction process can further comprise using streams that store data records having estimated update distances, in a range of estimated update distances that is variable and based on the estimated update distances of the data records received by and stored in the streams. In embodiments, a compaction process can further comprise: creating a new stream to store a live record, if none of the existing streams has a range of estimated update distances that includes the estimated update distance of the live record; and merging two streams, if one of the existing streams stores less than a set minimum number of data records. In embodiments, a compaction process can further comprise: using streams, each stream having a set memory limit; determining the stream for which the compaction process is expected to reduce write amplification the most; using a triggering condition based on whether the stream's memory usage exceeds the stream's set memory limit; selecting for compaction the segment in the stream, having the fewest live versions of data records; selecting for each live record of the segment, the stream having a range of estimated update distances that includes the estimated update distance of the live record, based on the live record's estimated update distance; and appending the live record to the selected stream. In embodiments, a compaction process can further comprise using streams that store data records having estimated update distances, in a range of estimated update distances that is fixed. In embodiments, a compaction process can further comprise using streams that store data records having estimated update distances, in a range of estimated update distances that is variable and based on the estimated update distances of the data records received by and stored in the streams. In embodiments, a compaction process can further comprise: creating a new stream to store a live record, if none of the existing streams has a range of estimated update distances that includes the estimated update distance of the live record; and merging two streams, if one of the existing streams stores less than a set minimum number of data records. In embodiments, determining the stream for which compaction is expected to reduce write amplification the most, can comprise: optimally distributing memory usage among the streams by formulating the optimal distribution of memory usage among the streams as an optimization problem, and periodically computing the optimal distribution. In embodiments, an optimization problem can be formulated by: using for each stream: the number of data records assigned to the stream, the fraction of updates to the stream relative to the total number of updates to all streams, and the Lambert W function to express the probability that the earliest version of a data record has not been updated in the stream; summing the products between fractions of updates and probabilities; and minimizing the summation of products between fractions of updates and probabilities, considering the memory limits of each stream, and the memory limit of all the stream.

In embodiments, an append-only store can comprise: a plurality of streams, each stream designated to store at least one data record having an estimated update distance within a range of estimated update distances specific to the stream; an input operative to receive at least one of: a new data record and an updated version of a data record; a processor operative for: estimating the update distance of a data record; selecting in the append-only store of data records, a stream having a range of estimated update distances that includes the estimated update distance of a data record; and writing a data record to the selected stream; wherein the estimated update distance of a data record P is substantially a function of the number of updates to data records other than data record P, between successive updates to data record P. In embodiments, an append-only store can further comprise a separate data structure, referred to as a log directory, that keeps track of the location of a record, the version of a record, and other information about each record.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for updating an append-only store, comprising:
    dividing into streams the append-only store, each stream storing at least one data record having an estimated update distance, and each stream corresponding with a different range of estimated update distances;
    receiving a data record;
    estimating the update distance of the data record;
    selecting in the append-only store, a stream having a range of estimated update distances that includes the estimated update distance of the data record; and
    writing the received data record to the selected stream;
    wherein for a data record P, the estimated update distance $D(P)$, of the data record P, is a function of the number of updates to data records other than data record P, between successive updates to data record P.

2. The method of claim 1, wherein estimating the update distance of a data record comprises:
    computing the logarithmic update distance between at least one pair of successive updates of the data record received; and
    computing the exponentially weighted moving average (EWMA) of the logarithmic update distance, using the logarithmic update distances between the at least one pair of successive updates of the data record received.

3. The method of claim 1, wherein selecting a stream comprises, for each stream:
    computing the logarithmic update distance between at least one pair of successive updates of a data record in the stream;
    computing the exponentially weighted moving average (EWMA) of the logarithmic update distance, using the at least one pair of successive updates of a data record in the stream;
    computing the exponentially weighted moving standard deviation of the logarithmic update distance, using the at least one pair of successive updates of the data record in the stream, and
    selecting a stream based on
        the exponentially weighted moving average (EWMA) of the logarithmic update distance, and
        the exponentially weighted moving standard deviation of the logarithmic update distance.

4. The method of claim 1, wherein a range of estimated update distances that is specific to a stream has fixed bounds.

5. The method of claim 4, wherein the fixed bounds of a range of estimated update distances are equally spaced on a logarithmic scale.

6. The method of claim 1, wherein a range of estimated update distances that is specific to a stream has variable bounds.

7. The method of claim 6, further comprising
    writing the data record to the stream, if the estimated update distance of the data record is within a factor of the standard deviation from the estimated update distance in the stream;
    verifying a neighbouring stream, and assigning the data record to the neighbouring stream, if the estimated update distance of a data record is within a factor of the standard deviation from the estimated update distance in the neighbouring stream;

creating a new stream, if the estimated update distance of a data record is outside a factor of the standard deviation from the estimated update distance in any stream; and merging a stream with another stream, if either stream contains less than a set minimum number of data records.

8. The method of claim 7, wherein conditions for creating a new stream further include:

the number of streams remains less than a set maximum number of streams; and the estimated average logarithmic update distance and standard deviation in a stream are calculated using at least a set minimum number of updates in the stream.

9. The method of claim 1, further comprising dividing each stream into at least one segment, each segment storing at least one data record, and performing a compaction process that is triggered under user-defined conditions; and comprises:

copying live records from one segment of a stream to another stream, and discarding a segment storing at least one obsolete data record;

where a live record is a data record that is not obsolete and that must not be discarded.

10. The method of claim 9, wherein the compaction process further comprises:

using an append-only store having a set memory limit;

using a triggering condition based on whether the memory required to store the data records exceeds the append-only store's set memory limit;

finding in the streams, the segment having the fewest live versions of data records;

selecting for each live record, of the segment having the fewest live versions of data records, the stream having a range of average logarithmic update distances that includes the average logarithmic update distance of the live record, based on the live record's average logarithmic update distance as estimated using EWMA methods; and appending the live record to the selected stream.

11. The method of claim 10, wherein the compaction process further comprises using streams that store data records having estimated update distances, in a range of estimated update distances that is fixed.

12. The method of claim 10, wherein the compaction process further comprises using streams that store data records having estimated update distances, in a range of estimated update distances that is variable and based on the estimated update distances of the data records received by and stored in the streams.

13. The method of claim 10, wherein the compaction process further comprises:

creating a new stream to store a live record, if none of the existing streams has a range of estimated update distances that includes the estimated update distance of the live record; and merging two streams, if one of the existing streams stores less than a set minimum number of data records.

14. The method of claim 9, wherein the compaction process further comprises:

using streams, each stream having a set memory limit;

determining the stream for which the compaction process is expected to reduce write amplification the most;

using a triggering condition based on whether the stream's memory usage exceeds the stream's set memory limit;

selecting for compaction the segment in the stream, having the fewest live versions of data records;

selecting for each live record of the segment, the stream having a range of estimated update distances that includes the estimated update distance of the live record, based on the live record's estimated update distance; and appending the live record to the selected stream.

15. The method of claim 14, wherein the compaction process further comprises using streams that store data records having estimated update distances, in a range of estimated update distances that is fixed.

16. The method of claim 14, wherein the compaction process further comprises using streams that store data records having estimated update distances, in a range of estimated update distances that is variable and based on the estimated update distances of the data records received by and stored in the streams.

17. The method of claim 14, wherein the compaction process further comprises:

creating a new stream to store a live record, if none of the existing streams has a range of estimated update distances that includes the estimated update distance of the live record; and merging two streams, if one of the existing streams stores less than a set minimum number of data records.

18. The method of claim 14, wherein determining the stream for which compaction is expected to reduce write amplification the most, comprises optimally distributing memory usage among the streams by formulating the optimal distribution of memory usage among the streams as an optimization problem, and periodically computing the optimal distribution.

19. The method of claim 18, wherein the optimization problem is formulated by:

using for each stream:

the number of data records assigned to the stream, the fraction of updates to the stream relative to the total number of updates to all streams, and the Lambert W function to express the probability that the earliest version of a data record has not been updated in the stream;

summing the products between fractions of updates and probabilities; and minimizing the summation of products between fractions of updates and probabilities, considering the memory limits of each stream, and the memory limit of all the streams.

20. An append-only store comprising:

a plurality of streams, each stream designated to store at least one data record having an estimated update distance within a range of estimated update distances specific to the stream;

an input operative to receive at least one of: a new data record and an updated version of a data record;

a processor operative for:

estimating the update distance of a data record;

selecting in the append-only store of data records, a stream having a range of estimated update distances that includes the estimated update distance of a data record; and writing a data record to the selected stream;

wherein the estimated update distance of a data record P is a function of the number of updates to data records other than data record P, between successive updates to data record P.

21. The append-only store of claim 20, further comprising a separate data structure, referred to as a log directory, that keeps track of the location of a record, the version of a record, and other information about each record.

* * * * *